United States Patent [19]

Moll

[11] 4,099,102
[45] Jul. 4, 1978

[54] MOVABLE FEEDING APPARATUS FOR HIGH SHELF STORAGE DEVICES

[75] Inventor: Hans Moll, Augsburg, Fed. Rep. of Germany

[73] Assignee: Maschinenfabrik-Augsburg-Nurnberg Aktiengesellschaft, Fed. Rep. of Germany

[21] Appl. No.: 604,955

[22] Filed: Aug. 15, 1975

Related U.S. Application Data

[63] Continuation-in-part of Ser. No. 423,983, Dec. 12, 1973, abandoned.

[51] Int. Cl.² ............................................. H02P 5/50
[52] U.S. Cl. ............................... 318/85; 214/16.4 A; 318/603; 318/625
[58] Field of Search ............... 318/38, 625, 675, 85, 318/626, 601, 50; 214/16.4 A

[56] References Cited

U.S. PATENT DOCUMENTS

| 2,578,988 | 12/1951 | West ......................................... 318/50 |
| 3,408,549 | 10/1968 | Shimabukuro ........................... 318/85 |
| 3,622,703 | 11/1971 | Ricketts et al. ......................... 318/85 |
| 3,718,846 | 2/1973 | Bejach ..................................... 318/85 |
| 3,719,295 | 3/1973 | Grace .......................... 214/16.4 A X |
| 3,782,565 | 1/1974 | Doran et al. ................... 214/16.4 A |
| 3,906,327 | 9/1975 | O'Callaghan et al. ............... 318/603 |

FOREIGN PATENT DOCUMENTS 627,915  9/1961  Canada ............................... 105/29R Primary Examiner—Robert K. Schaefer
Assistant Examiner—John J. Feldhaus
Attorney, Agent, or Firm—Craig & Antonelli

[57] ABSTRACT

A high shelf feeding apparatus is movable on rollers riding on rails. It is moved either by motor driven friction gear drive means or by a linear motor means. In either case, the drive elements are operated at the same acceleration or at the same number of revolutions by connecting each drive element with a regulating mechanism which measures the distance travelled by each drive element and then balances each such measured distance in relation to a rated value common to all regulating mechanisms.

12 Claims, 3 Drawing Figures

MOVABLE FEEDING APPARATUS FOR HIGH SHELF STORAGE DEVICES

This is a continuation-in-part of application Ser. No. 423,983, filed Dec. 12, 1973, now abandoned.

BACKGROUND AND SUMMARY OF THE INVENTION

The present invention relates to a movable driven feeding apparatus for high shelf stores and, more particularly, to a feeding apparatus supported on rollers and having drive elements which are independent of the weight of the feeding apparatus and are effective in two or more planes disposed one above the other.

Movable feeding mechanisms for high shelf stores of one type have in the past been driven at one of their ends by the same rollers that support the weight of the feeding apparatus on the track. In this structure, only if the roller bearings are uniformly lubricated can the weight remain constant. Therefore, the rolling resistance of the entire feeding apparatus remains substantially the same from start to stop, while the friction value which effects a uniform drive and determines the slip between roller and rail depends on external influences (e.g., dust) and, therefore, varies. Furthermore, when such a feeding apparatus is accelerated at one end only, the non-driven portions of the feeding apparatus lag somewhat with respect to the driven end and cause the entire feeding apparatus to start vibrating in the direction of travel. As a result such vibrations must be allowed to subside before a feeding from and to the feeding device is possible.

The same result occurs also when such an apparatus is decelerated too strongly by braking or when the drive is nonuniform and jerky. Only when acceleration and speed of the feeding apparatus are very low can the vibrations and consequent waiting periods be avoided. In this case, however, a longer traveling period will occur instead of the long waiting periods. In order to shorten traveling time or waiting periods, such feeding devices have been reinforced but at high cost. Thus, to be sure, starting and braking vibrations were reduced, but the high weight of the feeding apparatus and reinforcement prevented a speedy start and stop.

Another type of very high movable feeding apparatus for high-shelf stores is driven in several superposed planes with as much synchronization as possible in order to ensure uniform acceleration at all levels and to move the stored items exactly as required. In such an apparatus it is conventional to provide gears as the drive elements in the drive levels or planes. Stationary or static racks mesh with the gear drive elements which are synchronized by common shafts. Such a positive transmission seeks to ensure that a fixed drive system revolution rate is converted into a fixed distance traversed by the feeding apparatus. However, many difficulties arise when the feeding apparatus is of great height and, in particular, when it is a hanging construction since there is a significant lack of rigidity. Thus, the constantly changing transmission area defined by the gears and their associated static racks cause oscillations to arise in the drive shafts. Input torques experience phase displacement due to the length of the shafts. Furthermore, the necessary backlash which, however, is increased even further because of wear gives rise to impermissibly high tolerances when moving the individual stored items. In such a system, an error in the drive mechanism can cause a drive element to advance or retard without any ability to correct the error. When the tolerances become too great it is therefore necessary to carry out extensive replacement of the gears and racks.

One solution to correct this problem has been suggested in German Offenlegungsschrift No. 1,531,888 whereby an error in movement is to be corrected by switching a friction gear drive to a rack and pinion drive in the second plane. However, this drive is not suitable for balancing out errors and play in the rack and pinion pairs. Although the use of rack and pinion drive pairs enables the torque of the individual drive units to be exactly assigned to each other, the tooth backlash necessarily limits the accuracy of movement of the stored items. Again, when such drive pairs become worn, very expensive repair work is required. Thus it can be readily seen that in previously known drive mechanisms it was not possible to effectively eliminate the wear occuring as a result of repeated operation of the feeding apparatus over a period of time. The contact between the working surfaces leads not only to wear but also to considerable noise. Furthermore, wear is also increased by the exposure of the meshing working surfaces to a particularly high degree of dirt.

The object of this invention is to construct a movable, very high feeding apparatus in such a manner that strong positive and negative accelerations and high traveling speeds are possible, while vibration of the entire feeding apparatus in the traveling direction is prevented.

A further object of the present invention is the provision of a feeding apparatus for finding a high-shelf store driven in various superposed places and insensitive to a large degree to wear and dirt without, however, sacrificing any accuracy in placing or extracting an item.

A still further object of the present invention is the provision of an improved feeding apparatus for accurately finding a desired item at any level independently of wear and so that only inexpensive repairs are needed when extensive wear has occurred.

The foregoing objects have been achieved in accordance with the present invention by providing a feeding apparatus with positive drive elements independent of the weight of the feeding apparatus operated in two or more superposed planes and connected with working surfaces stretching along the length of the track of the feeding apparatus.

A feeding apparatus according to the present invention with positive drive elements operated in two or more superposed planes can be rapidly sped up or slowed down by the uniform action of acceleration forces without undergoing vibration. To assure such operation, the drive elements must be operated at the same acceleration or number of revolutions in order to produce a uniform drive speed in all driven planes of the feeding apparatus. According to the present invention, each drive element is connected with a regulating mechanism which measures the distance travelled by each drive element by means of primary elements and then balances each such measured distance in relation to a nominal or rated value common to all regulating mechanisms by controlling the drive of each drive element. If, for example, the feeding apparatus is driven by drive rollers with a vertical shaft meshed in frictional engagement with horizontal rails constituting the running or working areas, the regulating mechanisms assure that all the drive elements have the same speed or have the same acceleration. Thus the present invention has made the harm ordinarily caused by wear and dirt in a positive drive system only of secondary importance by providing a drive system whose positive meshing and regulating means enable each of the drive elements to be moved to an exactly predetermined item quite independently of wear or dirt on the working surface.

The regulating mechanism assigned to each drive element for directly registering the distance travelled by the associated drive element determines by means of the pick-up value the accuracy with which the feeding apparatus moves to an item controlled at every drive level with respect to a common rated value. It is not only the relative movements of the individual drive levels that are regulated during braking or accelerating but also those arising from high unilateral stress on the feeding apparatus due to strong acceleration or braking of the loaded carriage, thereby enabling the feeding apparatus to have a particularly light design which is more inexpensive to construct. Moreover, time and money can be saved by virtue of the high acceleration values obtainable due to the low weight made possible by the economically designed regulating drives. Because of the upright design, the feeding apparatus needs to be buckle-resistant only over the distance between two drive elements. Where a suspended design is employed the permissible horizontal deflection must not be exceeded between two drive elements, thus the overall height can be disregarded. The distance is registered directly by means of a primary element, and not by means of secondary values such as friction gear revolutions, thereby eliminating disturbance variables.

The rail surfaces which bear the weight of the rollers and thus the weight of the entire feeding apparatus, must be substantially horizontal. Impurities, such as oil drops, dust, etc., adhere, therefore, to the surface. However, a shock-free, positive drive requires a stable condition of the friction gears. Such a stable condition of the friction gears, however, can only be assured for a longer period of time if, by the arrangement of these friction gears, deposits are prevented on one or both parts of the gear which might disturb the uniform traveling operation of the feeding apparatus. It is, therefore, advisable, to position, in one embodiment of the present invention, the surface of the friction gear vertically so as to prevent soiling. The pressure forces necessary for a safe functioning of the friction gear can be produced by simple, structural devices, e.g., pressure springs.

The axle of the drive rollers runs vertically and the running surface is also vertical. Not only does this arrangement guarantee that the drive is independent of the net weight of the feeding apparatus in order to achieve continuity of operation and wear conditions but it also prevents oil, dirt or the like from settling on the working surface. As will be readily appreciated the presence of such foreign matter on the working surface can lead to uneven force transmission and a high degree of wear which, particularly when the force transmission is uneven, would require the regulating drive to have a high power requirement in order to balance out the unevenness.

On advantage of the arrangement constituting the present invention is that the friction gear drive is able to be moved accurately to any point without the wear of the permissible wear area leading to any tolerances. Moreover the friction gear drive always has the same force transmission area so that the drive does not induce oscillations in the feeding apparatus as can arise due to the periodic yielding behavior of some of the apparatus components. In addition, the replacement or repair of the friction surfaces can be accomplished more economically.

According to another feature of the present invention the distance covered by a drive element is the rated value for the regulating means connected with other drive element. Thus, the leading drive element can be controlled by conventional regulating control equipment, safety switches, and even manually such that the secondary regulating circuits ensure that the feeding apparatus accurately follows the leading drive in all drive levels.

Another embodiment of the present invention employs linear motors as drive elements which are in magnetic force mesh with work areas which, in particular, can be made of aluminum. Such arrangement enables the entire feeding apparatus to be driven contact-free so that the condition of the surface, dirt on the work surface or the like is of no importance. Furthermore, the drive is virtually silent and is without moving parts in the drive elements. Thus, the drive elements are completely wear- and maintenance-free. However, the linear motors and the working surface can be given an additional friction layer on their opposed surfaces so as to allow reciprocal movement when impermissible vibrations occur without causing any damage.

A still further embodiment of the present invention uses electrical guide magnets connected with one regulating device to keep the lateral distance constant between the feeding apparatus and the shelf made of ferromagnetic material opposite a working track on the shelf side. This arrangement eliminates any need whatsoever for distance rolls or guide rolls whereby, due to the inertia of the regulator controlling the guide magnet, a damping action is achieved and effectively counteracts the vibrations of the feeding apparatus. A guide magnet can also be associated with the linear motor means to ensure that the air gap between a linear motor and the corresponding working surface is always the optimum amount and to assist in completely eliminating mechanical friction which causes power losses, wear and noise.

BRIEF DESCRIPTION OF THE DRAWINGS

These and further objects, features and advantages of the present invention will become more obvious from the following description when taken in connection with the accompanying drawings which show, for purposes of illustration only, several embodiments in accordance with the present invention and wherein.

DETAILED DESCRIPTION OF SEVERAL PREFERRED EMBODIMENTS

Figure 1:
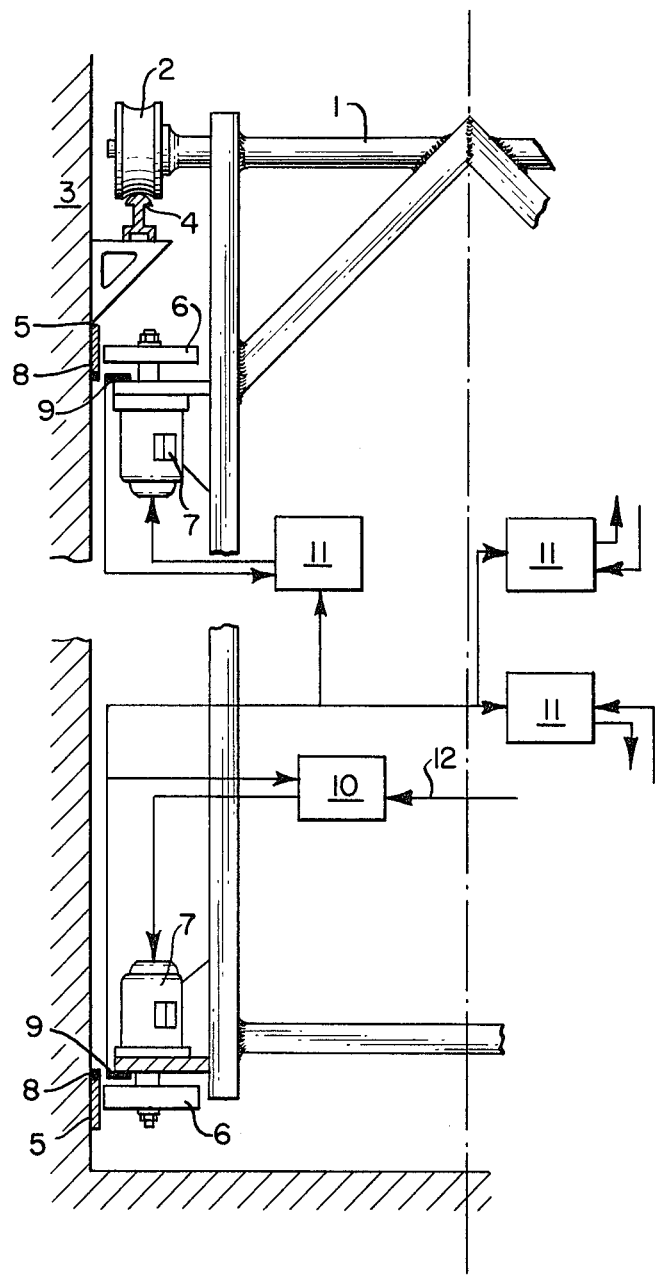
FIG. 1 is a view of one-half of a symmetrical feeding apparatus of the invention seen in the direction of travel and illustrating the regulating circuitry.

Referring now to the drawings and, in particular, FIG. 1, the feeding apparatus 1 of the invention is movably supported by two bearing rollers 2 on rails 4 laterally mounted to the shelves 3 to which material is to be fed. Since the lifting unit required for lifting and lowering the feeding apparatus is not necessary for an understanding of the present invention, the lifting unit has been omitted from the drawing in order to simplify matters. Horizontal rack 5 is mounted to the shelves in superposed planes on either one or both sides of the feeding apparatus 1 and has a length commensurate with the length of the rails 4. The feeding apparatus 1 is driven by two electic motors 7 on both sides of the feeding apparatus, each drive having an associated device for measuring the distance covered. This can include a horizontal coding rail 8 and a measuring gauge 9 mounted on the feeding apparatus 1 near the drive. Each measuring gauge 9 is connected to the motor 7 via a regulating circuit 11 such that the leading regulating circuit 10 receives a rated value 12 from outside and all other regulating circuits 11 are switched to the rated value of the distance covered by the leading regulating circuit 10. As a result, all drive units follow in the path of the main drive unit depending, of course, upon the regulating accuracy. Furthermore, the operation of the drive elements at the same velocity or at the same acceleration produces a uniform drive speed in all driven planes of the feeding apparatus and allows the drive elements to be rapidly sped up or slowed down without experiencing vibration. Such an arrangement also renders the damage normally caused by wear and dirt of only secondary importance since each of the drive elements can be moved to an exactly predetermined item independently of wear or dirt on the working surface.

Figure 2:
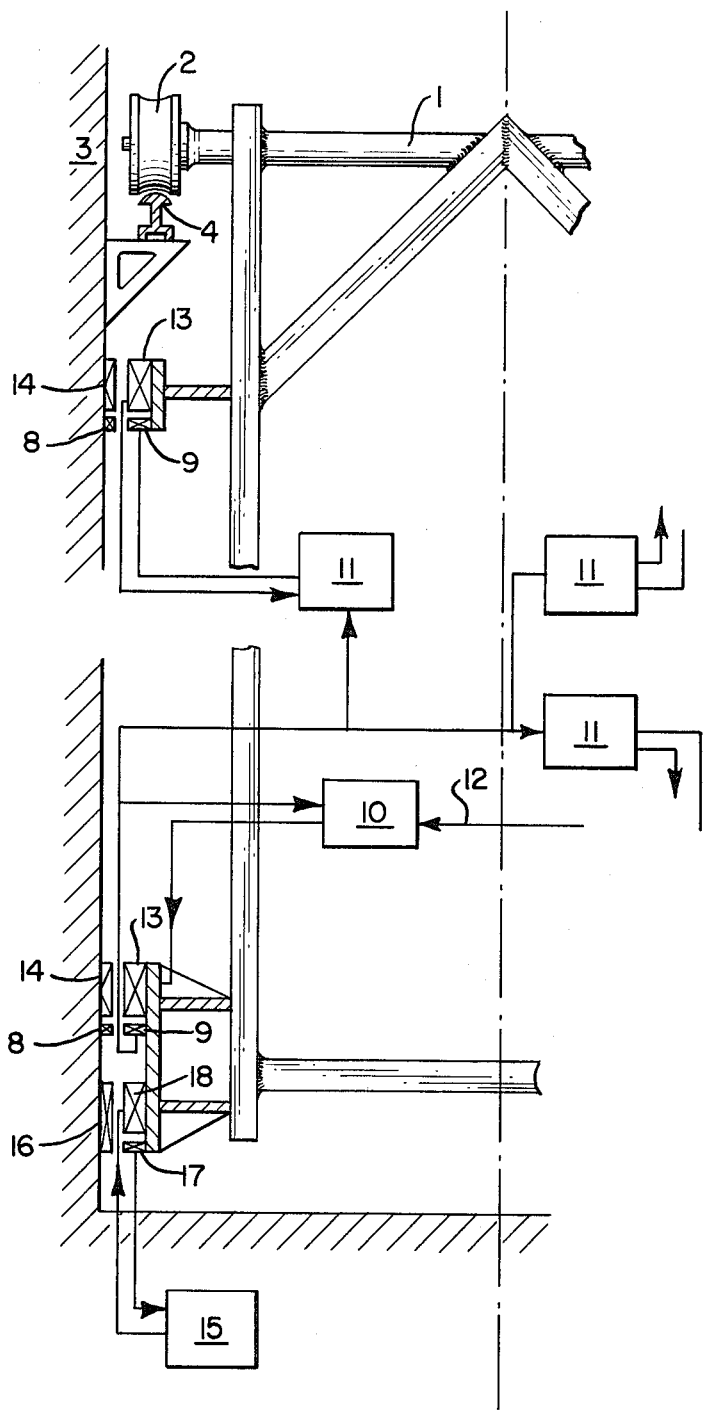
FIG. 2 is a view similar to FIG. 1 but showing a second embodiment where the drive is effected by linear motors.

In the embodiment shown in FIG. 2, where like parts are described by the same numerals, linear motors 13 are used in lieu of the electric motors 7 and act on opposed aluminum working areas 14 in lieu of racks 5. On the bottom side of the feeding apparatus 1 a working surface 16 on the shelf side and made of ferromagnetic material is provided. Opposite the surface 16 are a distance gauge 17 and an electromagnet 18 on the feeding apparatus. The corresponding signals for maintaining the spacing between electromagnet 18 and the working surface 16 are conducted by the measuring gauge 17 to the regulating unit 15 which amplifies and converts the signals and feeds the signal to the electromagnet 18 as a regulating current.

Figure 3:
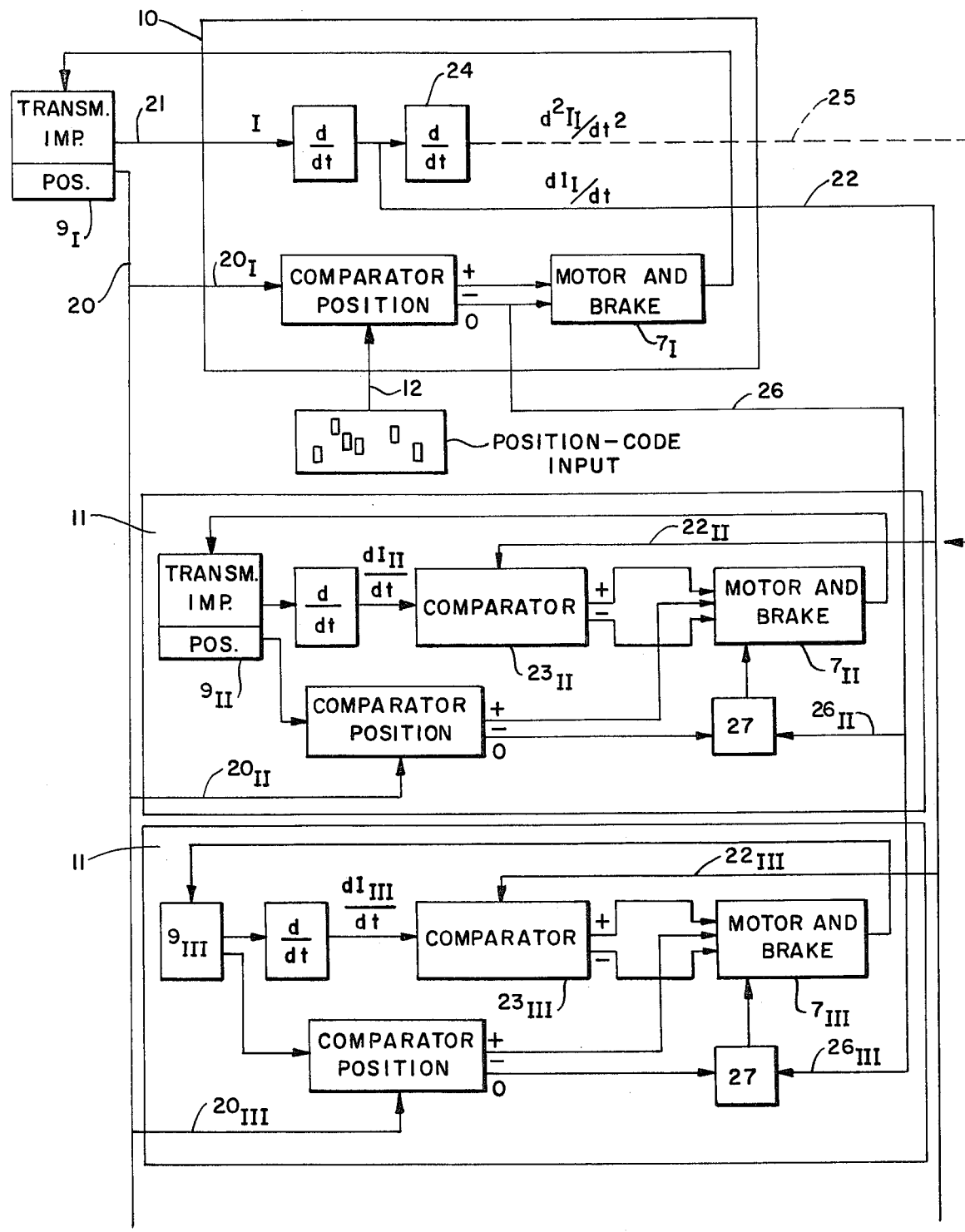
FIG. 3 is an example of the type of regulating circuitry which can be used in conjunction with the feeding apparatus of the present invention.

FIG. 3 uses like reference numerals for those parts corresponding to the parts shown in FIGS. 1 and 2. A measuring gauge $9_I$ functions as a positioning and impulse transmitter, deriving from the coding rail 8 the instantaneous position and furthermore recording, by means of a scanning mechanism, the number of pulses passing by, wherein these pulses can be of an optical as well as electromagnetic type by a corresponding construction of the coding rail 8. The value of the instantaneous position is introduced by the transmitter $9_I$ via connections 20 and $20_I$ into a comparator which compares this positional value coming from the measuring gauge $9_I$ with a desired positional value fed from a position-code input via a line 12 to the comparator. If this comparison shows equality, then the comparator switches the drive unit $7_I$ consisting of motor and brake to zero, i.e., the motor 7 is turned off and the brake is activated so that the feeding device 1 is directly arrested. If the comparison in the comparator yields inequality, then depending on the direction of this inequality, a positive (plus) or a negative (minus) signal is transmitted to the drive unit $7_I$ and thereby a drive in one direction (plus) or in the other direction (minus) is effected, for which purpose the motor 7 is switched on with the corresponding polarity and the brake is inactivated.

To attain in each plane an exactly accurate positioning of the feeding device 1, the instantaneous position determined by the transmitter $9_I$ is fed via the operative connection 20 also to the other regulating circuits 11, namely in each case via branch connections $20_{II}$ and $20_{III}$, respectively, etc. In each regulating circuit 11, a comparator of the above-described type is provided; via the lines $20_{II}$, $20_{III}$ and so on, the desired positional value is fed to the position comparators, as effected in case of the regulating circuit 10 by means of line 17. The actual positional value for the respective drive is fed to the comparator from transmitters $9_{II}$, $9_{III}$, etc., fashioned in the same manner as the transmitter $9_I$ as scanning devices for the position and as pulse counters.

In order to maintain the movement of the feeding apparatus 1 identical in all planes, i.e., to prevent oscillations, a speed control is provided in addition to the positional regulation, wherein the pulse scanning device of the transmitter $9_I$ feeds the number of passing pulses via a line 21 to a differentiating network where a first differentiation according to time is conducted, i.e. the path length derived via line 21 is converted into a speed value. This speed value of the feeding apparatus 1 at the point of transmitter $9_I$ is fed via a line 22 and branch lines $22_{II}$, $22_{III}$ as a desired value to the speed comparators $23_{II}$ and $23_{III}$ in the regulating circuits 11 and compared therein with a corresponding actual value of the speed of the respective transmitters $9_{II}$ and $9_{III}$, wherein the speed value of the transmitters $9_{II}$ and $9_{III}$ is obtained in the same way as described above for the transmitter $9_I$. The speed comparators yield positive or negative output pulses, depending on the result of the comparison, wherein these output pulses are fed to the drive mechanisms $7_{II}$ and $7_{III}$, respectively, and a positive pulse causes an increase in engine power, while a negative pulse activates the brake. Thus, if the desired speed value fed to the comparator $23_{II}$ via line $22_{II}$ is higher than the actual speed value fed to the comparator $23_{II}$ from the transmitter $9_{II}$ and the associated differentiating network, then this comparator $23_{II}$ emits a positive output signal leading to an increase in engine power at the drive unit $7_{II}$. In the reverse case, i.e., if the desired speed value in line $22_{II}$ is lower than the actual speed value obtained from transmitter $9_{II}$, then the comparator $23_{II}$ emits a negative pulse and thus activates the brake of the drive unit $7_{II}$, leading to a reduction of the speed of the feeding apparatus 1 in the respective plane.

A further refinement in control can be attained, for example, by connecting after the first differentiating network in the regulating circuit 10 a second differentiating unit 24, the output of which then corresponds to the acceleration value of the feeding apparatus 1 at the location of measuring probe $9_I$. A comparator can also be provided for comparing the acceleration values resulting after a twofold differentiation of the output values of the transmitters $9_I$, $9_{II}$, $9_{III}$, in the same manner as the comparator in the regulating circuits 11 is provided for the comparison of the speed values of the feeding apparatus in the planes of the measuring gauges $9_I$, $9_{II}$, and $9_{III}$, respectively. Such an arrangement is indicated merely by the dashed line 25 which is to feed the second differential $d^2 I_1/dt^2$, namely the output value of the second differentiating network 24, to the comparators of the regulating circuits 11. However, in the normal case, it will be sufficient merely to effect a speed comparison in the different planes of the feeding apparatus.

To control the drive units $7_{II}$, $7_{III}$ by the positional comparators in the regulating circuits 11, it is necessary to provide an additional operative connection 26. The 0-outputs of the positional comparators in the regulating circuits 11 are not to be connected directly to the drive units $7_{II}$ and $7_{III}$, as is the case for example in the regulating circuit 10, because otherwise, with the same positioning of the various measuring gauges 9 of the feeding apparatus 1, the brake of the drive unit $7_{II}$ or $7_{III}$ would be actuated. An activation of the arresting brakes of the drive units $7_{II}$ and $7_{III}$ may take place, however, only if 1. the position of all measuring gauges 9 is identical, i.e., all positional comparators emit the output signal and 2. additionally the arresting brake of the drive unit $7_I$ is applied.

For this reason, the arresting brakes of the drive units $7_{II}$ and $7_{III}$ are not directly activated by the 0-output of the positional comparators in the regulating circuits 11, but rather the 0-output of these positional comparators is applied to an AND member 27 to which is additionally connected the pulse of the 0-output of the positional comparators of the regulating circuits 10 by way of branch lines $26_{II}$ and $26_{III}$ via operative connection 26. The shifting of the arresting brake of the drive units $7_{II}$ and $7_{III}$ thus is effected only when a 0-pulse is applied to the AND members 27 via the branch lines $26_{II}$ and $26_{III}$ and simultaneously the AND members 27 receive a 0-pulse from the respective positional comparator.

While I have shown and described several embodiments in accordance with the present invention, it is understood that the same is not limited thereto but is susceptible of numerous changes and modifications as known to those skilled in the art. For example, the drive elements can be mounted symmetrically and in pairs so that in the event of a bearing axle break the overturning of the entire feeding apparatus is prevented. Furthermore, the feeding apparatus can be mounted in several superposed planes to wire ropes or like belts which are tensioned between driving elements arranged at both ends of the track. The feeding apparatus can also be supported by a single roller which is mounted approximately on the axis of the center of gravity of the apparatus to prevent it from swinging or vibrating. I therefore do not wish to be limited to the details shown and described herein but intend to cover all such changes and modifications as are encompassed by the scope of the appended claims.

I claim:

1. A high-shelf feeding apparatus which is movable on rollers and which has drive elements independent of the weight of the feeding apparatus in at least two superposed planes, where the improvement comprises means associated with each of the drive elements for measuring the distance travelled and regulating means associated with the measuring means for controlling the drive of each drive element by balancing each such measured distance in relation to a rated value common to the regulating means, and wherein electric guide magnet means are associated with said regulating means for keeping substantially constant the distance between the feeding apparatus and shelf.

2. A high-shelf feeding apparatus according to claim 1, wherein working surfaces are provided along the length of the movement path of the feeding apparatus and are operatively coupled with the drive elements.

3. A high-shelf feeding apparatus according to claim 1, wherein the rated value is the distance travelled by one of the drive elements.

4. A high-shelf feeding apparatus according to claim 2, wherein the drive elements comprise rollers mounted about a vertical axis and the working surfaces are in frictional engagement which said rollers.

5. A high-shelf feeding apparatus according to claim 4, wherein the rated value is the distance travelled by one of the drive element.

6. A high-shelf feeding apparatus according to claim 1, wherein the drive elements comprise linear motors which are magnetically force-meshed with the working surfaces.

7. A high-shelf feeding apparatus according to claim 6, wherein the rated value is the distance travelled by one of the drive elements.

8. A high-shelf feeding apparatus according to claim 6, wherein the working surface are made of aluminum.

9. A high-shelf feeding apparatus according to claim 2, wherein said electric guide magnet means are arranged opposite a working surface on the shelf side.

10. A high-shelf feeding apparatus according to claim 2, wherein the electric guide magnets are made of a ferromagnetic material.

11. A high-shelf feeding apparatus which is movable on rollers and comprises: a plurality of drive elements for moving said feeding apparatus and comprising linear drive motors which are independent from said rollers and further comprises means associated with each of the drive elements for measuring the distance travelled and regulating means associated with the measuring means for controlling the drive of each drive element by balancing each such measured distance in relation to a rated value common to the regulating means, and wherein electric guide magnet means are associated with said regulating means for keeping substantially constant the distance between the feeding apparatus and shelf.

12. A high-shelf feeding apparatus according to claim 11, wherein the rated value is the distance travelled by one of the drive elements.

* * * * *